United States Patent
Kwon et al.

[11] Patent Number: 5,959,720
[45] Date of Patent: *Sep. 28, 1999

[54] METHOD FOR COLOR BALANCE DETERMINATION

[75] Inventors: Heemin Kwon, Pittsford; Kenneth A. Carlson, Rochester, both of N.Y.

[73] Assignee: Eastman Kodak Company, Rochester, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/620,430

[22] Filed: Mar. 22, 1996

[51] Int. Cl.$^6$ .................................................. G03B 27/80
[52] U.S. Cl. .................................. 355/38; 355/35; 355/83
[58] Field of Search ................................... 355/35, 38, 83, 355/68; 396/569, 570, 563, 578; 356/404, 405

[56] References Cited

U.S. PATENT DOCUMENTS

| | | | |
|---|---|---|---|
| 4,154,523 | 5/1979 | Rising et al. | 355/38 |
| 4,159,174 | 6/1979 | Rising | 355/38 |
| 4,279,502 | 7/1981 | Thurm et al. | 355/38 |
| 4,642,684 | 2/1987 | Alkofer | 358/80 |
| 4,685,071 | 8/1987 | Lee | 364/526 |
| 4,757,351 | 7/1988 | Birgmeir | 355/38 |
| 5,081,485 | 1/1992 | Terashita | 355/38 |
| 5,119,125 | 6/1992 | Kraft | 355/38 |
| 5,223,892 | 6/1993 | Ikenoue et al. | 355/77 |
| 5,229,810 | 7/1993 | Cloutier et al. | 355/40 |
| 5,703,672 | 12/1997 | Terashita | 355/38 |
| 5,719,661 | 2/1998 | Terashita | 355/38 |

*Primary Examiner*—Safet Metjahic
*Assistant Examiner*—John Chizmar
*Attorney, Agent, or Firm*—Francis H. Boos, Jr.

[57] ABSTRACT

A method of color balance determination for use by a color copying apparatus utilizing a gray estimate established as a functional relationship among at least three basic color density values measured from regions within multiple image frames of a film order. This functional relationship is preferably a fitted line to a set of measured density values from which density values from regions of high color saturation have been excluded. To discriminate these high color saturation regions, the color saturation is determined relative to a gray point calculated as a weighted average of minimum density and image average density values. Further improvement in the gray estimate is achieved by limiting the set of measured density values to regions of high modulance ("edge effect") within the image frames.

11 Claims, 4 Drawing Sheets

METHOD FOR COLOR BALANCE DETERMINATION

FIELD OF THE INVENTION

The invention relates a method and apparatus for determining color balance for use in the copying of color original images such as in a photographic color printer.

BACKGROUND OF THE INVENTION

Automatic color photographic printers, such as the CLAS35 printer made by Eastman Kodak Company are known to employ color balance algorithms for determining the amounts of exposure light in each of a plurality of primary colors for use in exposing film images onto copy paper. In the CLAS35 printer, the algorithms rely on film channels with specific parameter values that are uniquely associated with each of the different film types encountered in the population of orders processed by the printer. This requires that a large library of parameter values be maintained and that the parameter values be updated as new film types are introduced. Additionally, changes in the photometric properties of existing film types caused, for example, by film processing errors or film storage at high temperatures or for long periods of time can introduce printing errors that are not compensated for by the film type parameter values.

U.S. Pat. No. 4,279,502 discloses a method of determining color balanced copying light amounts from photometric data derived directly from the film without the use of film type specific parameter values. In this method, first and second color density difference functional correlations are established from density values denoting the results of measurements at a plurality of regions of the film strip which includes the original image being copied. These correlations are then used for determining the copying light amounts for most of the originals on the film strip. The light amounts for originals containing illuminant error or color dominant subjects are selected differently using empirically determined threshold values. To be effective, this method requires the establishment of two different, independent functional relationships which may not capture the correct correlation among three primary color densities in the original image. There is therefore a need for a method of determining color balanced amounts of copying light that is based on the establishment of a single functional relationship among the image colors that captures the correlation among the three primary color densities.

SUMMARY OF THE INVENTION

In accordance with the present invention, there is provided a method of determining the individually controllable amounts of light in various colors to which photographic copying material is to be exposed in a color copying operation from a length of photographic original material including a series of discrete image-carrying sections, especially from a film strip including a series of color negatives. The method comprises the steps of individually photoelectrically measuring the density values of the original material in at least three basic colors at a plurality of regions of the original material; and establishing a single, multi-dimensional functional relationship among the at least three basic colors representing an exposure-level-dependent estimate of gray for use as values specific to said length of the original material for influencing the light amount control in the color copying operation.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
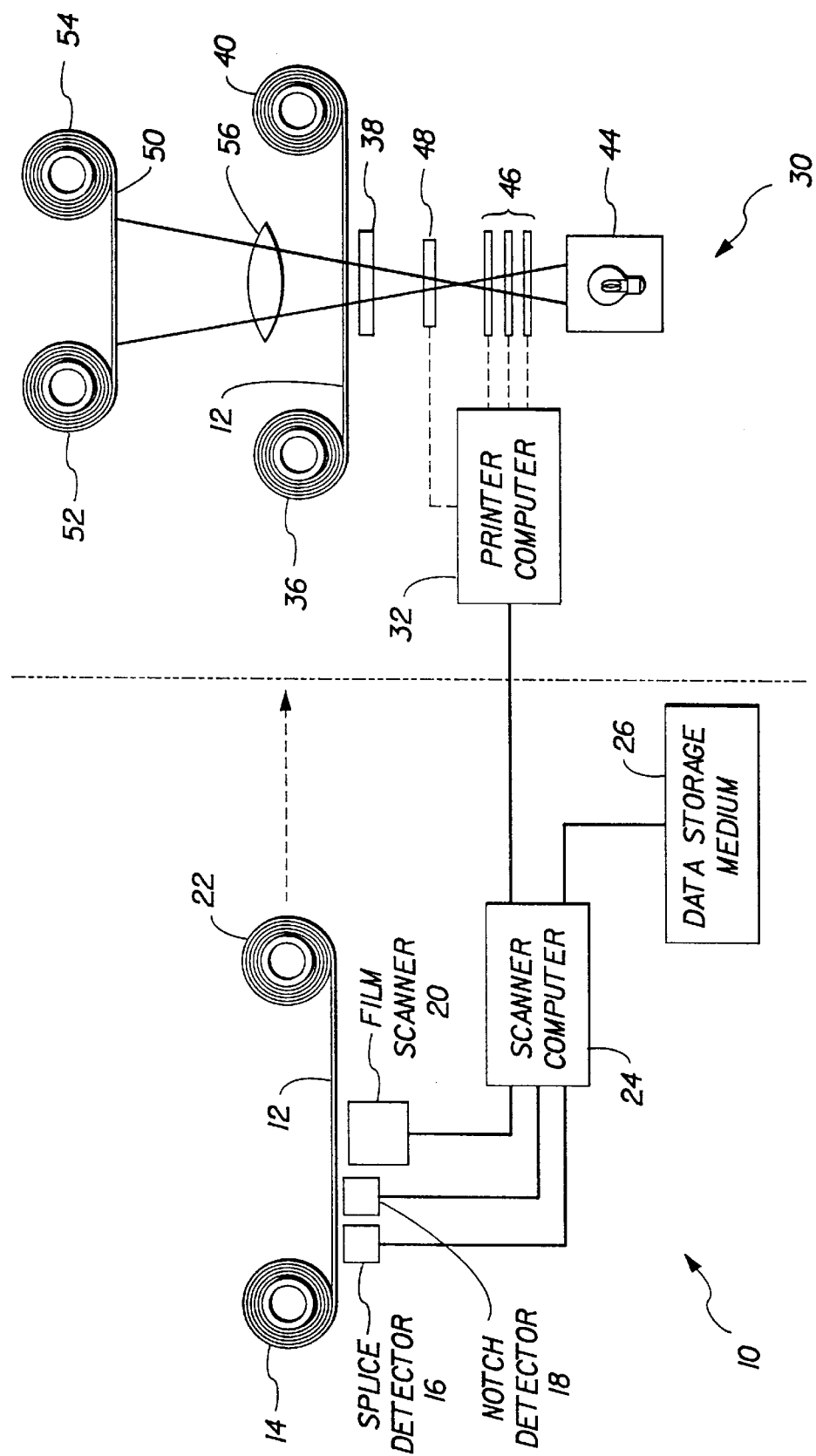
FIG. 1 is a basic block diagram of a film scanner and printer apparatus for performing the color balance method of the invention.
Figure 2:
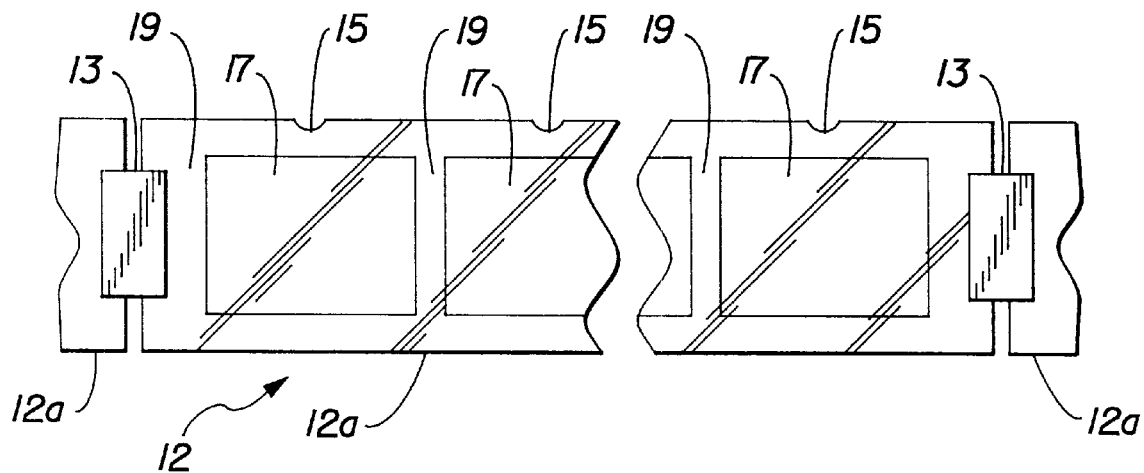
FIG. 2 is a plan view of portions of film strips showing splicing of successive film strip orders.

Referring to FIGS. 1 and 2, reference numeral 10 denotes film scanner apparatus and numeral 30 denotes film printer apparatus. In scanner 10, a length of film 12 comprised of a series of separate film strips 12a spliced together by means of adhesive connectors 13, is fed from a supply reel 14 past a splice detector 16, a notch detector 18 and a film scanner 20 to a takeup reel 22. Splice detector 16 serves to generate output signals that identify the beginning and end of each separate film order which is made up of a series of original image frames 17 on a single continuous film strip 12a. Notch detector 18 senses notches 15 formed in the film strip adjacent each original image and provides output signals that are used to correlate information generated in the scanner with specific original image frames. Scanner 20 photometrically measures, in known manner, the density values of three primary colors in a plurality of regions on the film strip 12a including the original image frames 17 as well as the interframe gaps 19. The term regions as used herein may be taken to mean individual image pixels or groups of pixels within an image frame. The signals from detectors 16,18 and scanner 20 are fed to a computer 24 which operates to determine optimum exposure levels at a subsequent printer 30. Data signals representing these optimum exposure levels may be communicated directly to a printer computer 32 or may stored on an intermediate storage medium 26 for later use by a printer 30.

Printer 30 operates to copy the individual images 17 from the film 12 fed from a supply reel 36 past a print gate 38 to a takeup reel 40. It will be appreciated that scanner 10 and printer 30 may be constructed as a single system in which case the film would be fed continuously from supply reel 14 to takeup reel 40 without interposition of the intermediate reels 22 and 36. In such a case it is only important that scanner 20 be located at an effective distance from print gate 38 that allows scanning of a significant number of original image frames 17 from a film strip 12a before the copying operation commences. For the image copying process, printer 30 is provided with a lamp house 44 which projects the exposure light through a series of color filters 46 and a shutter mechanism 48 which are controlled by computer 32 to control the light amounts in each of the primary colors used to expose the original image frames 17 from the film strip onto a strip of color copying material 50 fed from supply reel 52 to takeup reel 54. An optical system 56 controls the focus and magnification of the image onto the color copying material.

As part of the operation of computer 24 in determining the optimum exposure levels, a set of exposure dependent gray values for each film strip 12a is derived in the form of a single, three dimensional functional relationship among the measured three basic color density values, such as Red, Green and Blue. This functional relationship represents an exposure-level-dependent estimate of gray for use as values specific to the film strip 12a for influencing the light amount control in the color printer 30. Conceptually, the functional relationship representing gray is derived by creating a three dimensional scatter plot, of the type illustrated in FIG. 3, which shows a three dimensional scatter plot of three measured primary color densities, such as red, green and blue, within a color space bounded by red, green and blue axes. Although a three-dimensional functional relationship is described herein based on the scanning of the three Red, Green and Blue density values on the image frame, it will be appreciated that basic color densities other than Red, Green and Blue may be scanned to form the basis for the functional relationship. Additionally, the invention is not limited to three color densities since more than three color densities may be scanned. Consequently, in its broadest form, the invention contemplates that a multi-dimensional functional relationship is derived from at least three, and possibly more, scanned color densities of any suitable combination of appropriate colors.

The plotted points represent measured density values for the corresponding colors from regions on the film strip 12a. The functional relationship is established by plotting measured density values 60 derived from each of the regions measured by scanner 20 in the three dimensional color space and by then fitting a line 62 through the density values 60 using any one of the many well known line fitting methods, such as the method of least squares. Preferably, the functional relationship is an approximation in the form of polynomials of at least the second order. This fitted line 62 then serves as the exposure-level-dependent estimate of gray for the film strip 12a which is then used to influence the derivation of the optimum light exposure amounts in each color for each of the original film image frames 17. Such derivation is accomplished by use of known color balance algorithms such as the subject failure suppression technique described in the journal article "Modern Exposure Determination for Customizing Photofinishing Printer Response", E. Goll, D. Hill and W. Severin, Journal of Applied Photographic Engineering, Vol. 5, No. 2 (Spring 1979). While reference is made to conceptually creating a scatter plot, this is done for ease of visualizing the description of the invention. In actual practice, it will be appreciated by those skilled in the art that the gray estimate is created by inputting the density value data into the appropriate line fitting algorithm being run by computer 24.

In the above described method, density values 60 from all of the measured regions in the included group of image frames within film strip 12a were used in creating the scatter plot. It has been found to be advantageous in some instances to exclude data from certain regions when creating the scatter plot so as to improve the accuracy of the gray estimate, i.e. the fitted line 62. For example, regions with highly saturated colors such as represented by points 64 in the plot of FIG. 3 can bias the fitted line estimate. These high saturation regions may be caused by objects in the photographed scene that contain highly saturated colors, an example of which might be a person wearing bright red clothing. In establishing the gray estimate, it is important that the estimate mainly represent characteristics of the film strip 12a without bias from these saturated colors in the scene. It is therefore desirable to eliminate the density values from these saturated colors from the scatter plot used to establish the gray estimate. In order to eliminate the data from regions of saturated colors, it is necessary first to establish a reference point from which saturation values are calculated and then to establish a threshold level relative to the reference point for use in identifying the highly saturated colors to be eliminated.

Figure 4:
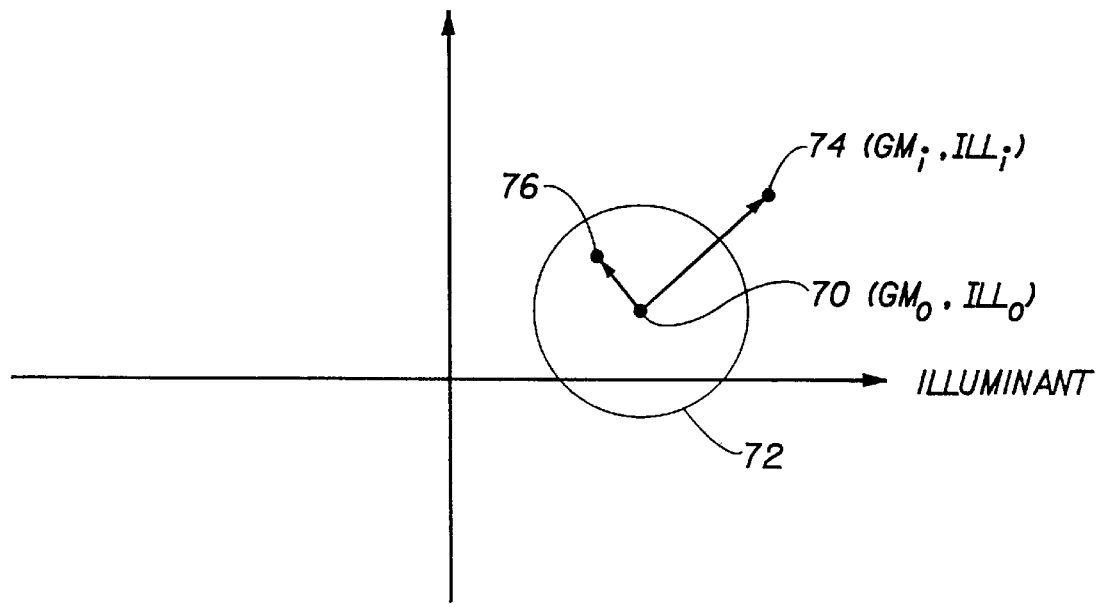
FIG. 4 is a plot of film density measurements in a transformed color space useful in describing a method of high saturation color discrimination for individual regions of an image frame.

While various techniques for elimination of highly saturated colors may be employed, the elimination is achieved in a presently preferred embodiment by first transforming the density values of the three primary colors into an alternative orthogonal color space in the manner described in commonly assigned U.S. Pat. No. 4,159,174, the disclosure of which is incorporated herein by reference. This transformed space is illustrated in the graph of FIG. 4, wherein the three primary color density measurements in three dimensional space are projected onto a green/magenta, illuminant plane which is perpendicular to a neutral axis. Reference point 70 is established in the following manner. From the measured density values of a plurality of regions on the film strip 12a, a set of minimum density values ($R_{min}$, $G_{min}$, $B_{min}$) is determined. Preferably the regions included for this purpose are taken from both the image frames 17 and the interframe gaps 19. The purpose is to identify an area on the film strip where there is no exposure. Normally, this would be expected to be found in the interframe gaps 19. However, it is known that for various reasons there may be some exposure e.g. fogging, in the gap areas and for this reason it is desirable to include the image frame regions in locating the minimum color density values. Next, the average color density values ($R_{av}$, $G_{av}$, $B_{av}$) for all regions within the included image frames 17 are determined. At this point, these two sets of values are transformed into the alternative orthogonal color space of FIG. 4 to obtain green/magenta and illuminant values ($GM_{min}$, $ILL_{min}$) and ($GM_{av}$, $ILL_{av}$) corresponding to minimum density values ($R_{min}$, $G_{min}$, $B_{min}$) and average density values ($R_{av}$, $G_{av}$, $B_{av}$), respectively. The weighted averages $GM_o$ and $ILL_o$ of these values are derived from the expressions:

$$GM_o = \alpha GM_{av} + (1-\alpha)GM_{min} \qquad (1)$$

$$ILL_o = \beta ILL_{av} + (1-\beta)ILL_{min} \qquad (2)$$

where the weighting values $\alpha$ and $\beta$ are each between 0 and 1 and are empirically determined from inspection of resulting color prints. Representative values that have been found to give good results are approximately $\alpha=0.6$ and $\beta=0.25$. These $GM_o$ and $ILL_o$ values establish the reference point 70 in FIG. 4. It may be noted here that, while the method disclosed in U.S. Pat. No. 4,279,502 performs a saturated color elimination using a calculation of saturation relative solely to minimum density ($R_{min}$, $G_{min}$, $B_{min}$), which corresponds to $GM_{min}$ and $ILL_{min}$ in the FIG. 4 color space, it has been found that this does not always give optimum results. This is believed to be because the gray point determined at minimum density levels does not accurately reflect the gray point corresponding to normal exposure levels. Thus, it has been found to be advantageous to include a measure of average density of regions from within the image frames 17 in the film strip 12a when determining the values of $GM_o$ and $ILL_o$.

In calculating the saturation of each of the regions, "i", in an image frame, the measured color values may preferably be transformed into the alternative orthogonal color space resulting in ($GM_i$, $ILL_i$). A saturation value ($SAT_i$) for a given region in an image frame is calculated relative to the reference point 70 ($GM_o$,$ILL_o$) in FIG. 4 as follows:

$$SAT_i = \sqrt{(GM_i - GM_o)^2 + (ILL_i - ILL_o)^2} \quad (3)$$

Figure 3:
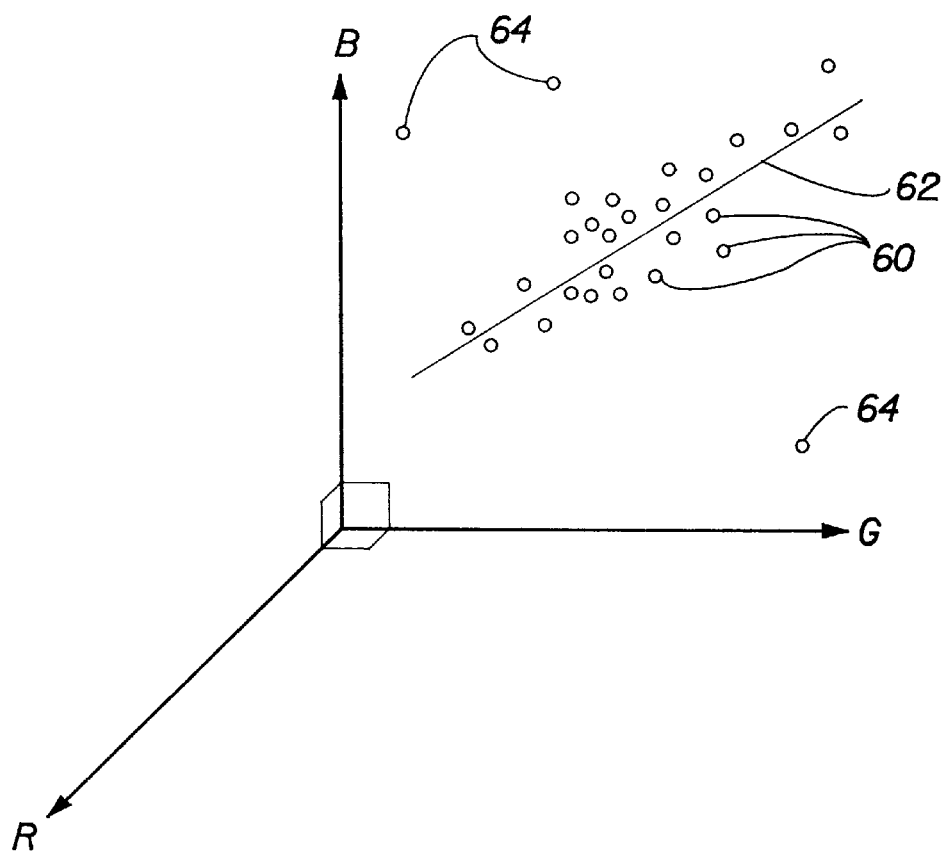
FIG. 3 is a three dimensional plot of film density measurements in three basic colors of image frames from a film strip order.

The saturation $SAT_i$ is then compared to a predetermined threshold value, represented by circle 72. When the saturation $SAT_i$ is greater than the threshold value, as in the case shown by point 74, the data from this region is excluded in creating the scatter plot of FIG. 3. Data from regions falling within the threshold 72, as represented by point 76, are included in the subset used for creating the scatter plot. In terms of the FIG. 3 plot, this would result in exclusion of widely scattered points 64, while the closely scattered points 60 are included. When the Red, Green and Blue regions are measured in terms of density and transformed to GM and ILL color space, the radius of threshold circle 72 is 0.15 in a presently preferred embodiment. The establishment of this threshold is an empirical determination and it will be understood that other threshold values may be established within the scope of this invention. Although the saturation clipping technique of FIG. 4 is a simple method using a uniform threshold shown by a circle 72 for all color directions (hues), it will be appreciated that it is also possible to have variable threshold values depending on the color direction similar to the subject failure suppression boundaries technique described in the above Goll et al journal article.

Figure 5:
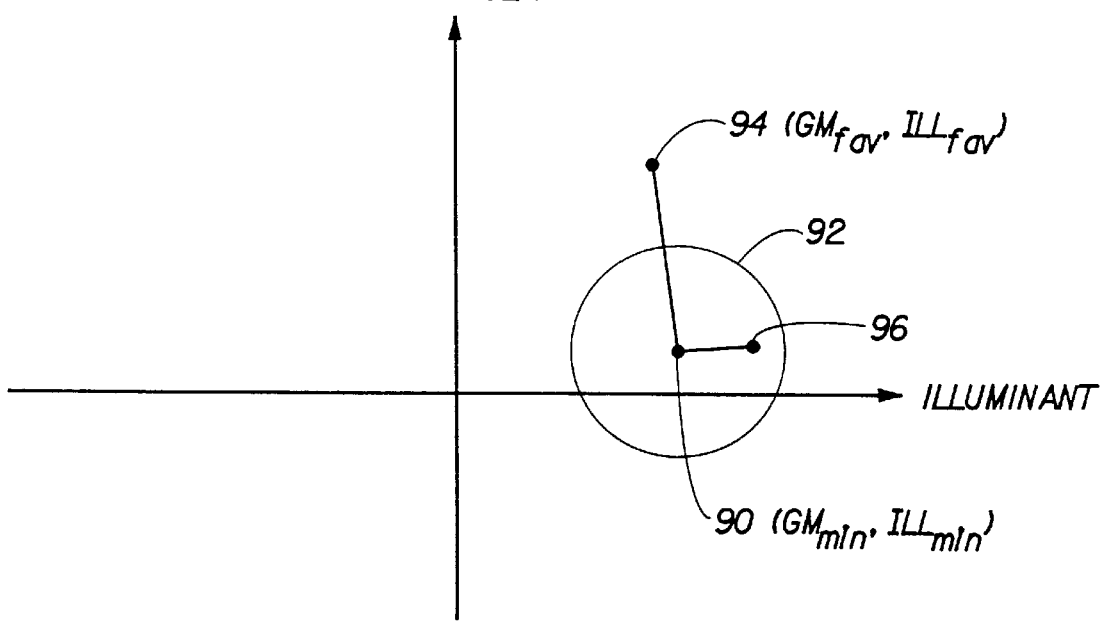
FIG. 5 is a plot of film density measurements similar to FIG. 4 used in describing high saturation color discrimination for entire image frames.

Highly saturated frames can bias the gray estimate ($GM_o$, $ILL_o$). As a further refinement for estimating the values $GM_o$ and $ILL_o$, provision can be made to eliminate highly saturated frames from the calculation of $GM_o$ and $ILL_o$. For each image frame 17, the average values $GM_{fav}$ and $ILL_{fav}$ are calculated in a manner similar to the calculation of $GM_{av}$ and $ILL_{av}$ as previously described, except that only regions within the frame are included in the calculation. It will be appreciated that $GM_{av}$ and $ILL_{av}$ are then the averages of $GM_{fav}$ and $ILL_{fav}$, respectively, for the entire order. Referring now to FIG. 5, the frame saturation is calculated relative to the previously described transformed values $GM_{min}$, $ILL_{min}$, point 90 in FIG. 5. A saturation value ($SAT_f$) for a given image frame in an order is calculated relative to the reference point 90 ($GM_{min}$,$ILL_{min}$) in FIG. 5 as follows:

$$SAT_f = \sqrt{(GM_{fav} - GM_{min})^2 + (ILL_{fav} - ILL_{min})^2} \quad (4)$$

The saturation $SAT_f$ is then compared to a predetermined threshold value, represented by circle 92. When the saturation $SAT_f$ is greater than the threshold value, as in the case shown by point 94, the values $GM_{fav}$ and $ILL_{fav}$ for this frame are excluded in the calculation of $GM_{av}$ and $ILL_{av}$. Data from frames falling within the threshold 92, as represented by point 96, are included in the calculation of $GM_{av}$ and $ILL_{av}$. In the special circumstance in which all the frames in an order are excluded by this frame saturation determination, it will be appreciated that the value of $GM_o$ and $ILL_o$ revert to $GM_{min}$ and $ILL_{min}$, respectively. As in the case of FIG. 4, the threshold value of circle 92 is determined empirically and in a presently preferred embodiment, a value of 0.25 is used, although other values may be used.

One of the effects of the just described frame elimination in calculating $GM_o$ and $ILL_o$ is that image frames exposed with artificial illuminant, e.g. tungsten illumination, are eliminated. In a proposed photographic system of the type described in commonly assigned U.S. Pat. No. 5,229,810—Cloutier et al, data can be recorded in a camera on a magnetic layer formed on the film. This data can include a data flag indicating that a particular frame has been exposed by artificial illumination. This recorded data may be used advantageously in the present invention by detecting the data flag and causing the data values of the corresponding frames to be excluded in the calculations of $GM_o$ and $ILL_o$ and/or the subsequent line estimate 62 of FIG. 3.

Figure 6:
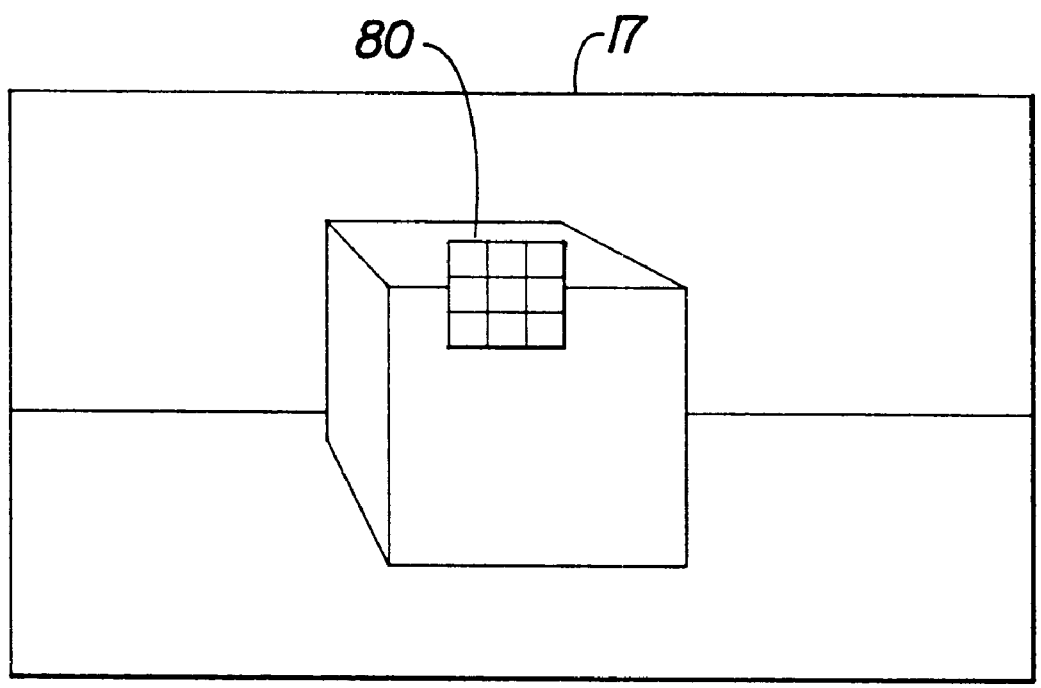
FIG. 6 is a diagram of a film image frame showing the operation of edge detection within the image frame.

To reduce the influence of large uniform areas of density within an image frame that would have the effect of biasing the line estimate 62 in FIG. 3, i.e. the exposure dependent gray, preferably only data from the high modulance regions of an image are included in the scatter plot. High modulance regions are determined by detecting edge regions occurring within an image frame 17. In a preferred embodiment, a filter operating on a 3×3 region matrix as shown in FIG. 6 is used. The difference between maximum and minimum neutral density for all nine regions within the matrix is determined and if the difference between maximum and minimum values, i.e. the "edge value", is below a predetermined threshold value, then the data is not included in the scatter plot. An effective threshold value for this purpose has been found empirically to be 0.2 neutral density in R,G,B color space or $0.2\sqrt{3}$ neutral density in the alternative orthogonal color space of FIG. 4. Areas of the image with high modulation tend to correlate well with those areas of the image that contain the subject. Consequently, the use of edge filtering as described above tends to include regions of the image that contain the subject and thus provides an improved gray estimate for color balance exposure settings according to the invention. It will be appreciated that this aspect of edge filtering makes the edge filtering technique also useful in determining neutral (i.e. lightness vs darkness balance) exposure settings and in implementing the aforementioned subject failure suppression technique.

In the case of an image frame in which a significant percentage of the regions have density values near minimum density ($R_{min}$, $G_{min}$, $B_{min}$) for the order, i.e. the length of the original material, the color correction determined by the single, three dimensional functional relationship (line 62 in FIG. 3) may not give optimum results for some film types. In this instance, it is desirable to modify the color correction to accommodate these low density frames. This may be accomplished by modifying the color balance point, $GM_k$, $ILL_k$, determined from the line 62 by proportionate amounts of $GM_{fav}$, $GM_{min}$ and $ILL_{fav}$, $ILL_{min}$. A presently preferred method for achieving this is to initially transform Red, Green and Blue density values into neutral values in the orthogonal color space of FIG. 4 where the neutral axis is perpendicular to the green/magenta and illuminant axes. The percentage "p" of low neutral density regions within the frame is determined by counting regions with neutral densities that are below an empirically determined neutral threshold, $N_t$, and dividing by the total number of regions in the frame. A weighting factor "w" is defined as:

$$w = \frac{p - p_o}{1 - p_o} \quad \text{for: } p \geq p_o \quad (5)$$

$$w = 0 \quad \text{for: } p < p_o \quad (6)$$

where "$p_o$" is an empirically determined threshold percentage of low density regions to the total number of regions in the frame. The final balance point $GM_b$, $ILL_b$ for the image frame is determined by the following equations:

$$GM_b = (1-w)GM_k + wqGM_{fav} + w(1-q)GM_{min} \quad (7)$$

$$ILL_b = (1-w)ILL_k + wqILL_{fav} + w(1-q)ILL_{min} \quad (8)$$

where q is a smoothing parameter between $GM_{fav}$, $GM_{min}$ and $ILL_{fav}$, $ILL_{min}$, and have values between 0 and 1.

Presently preferred values for use in the foregoing process are: $N_t$ is 0.5 above $N_{min}$, where $N_{min}$ is the neutral density of the minimum Red, Green and Blue densities for the length of original material; $p_o$ is 0.6; and q is 0.5. It will be understood that other values may be used based on empirical tests.

The invention has been described with reference to a preferred embodiment. However, it will be appreciated that variations and modifications can be effected by a person of ordinary skill in the art without departing from the scope of the invention.

PARTS LIST

| | |
|---|---|
| 10 | scanner |
| 12 | length of film |
| 12a | individual film strips |
| 13 | adhesive connector |
| 14 | supply reel |
| 15 | notches |
| 16 | splice detector |
| 17 | original image frames |
| 18 | notch detector |
| 19 | interframe gaps |
| 20 | film scanner |
| 22 | takeup reel |
| 24 | scanner computer |
| 26 | data storage medium |
| 30 | color printer |
| 32 | printer computer |
| 36 | supply reel |
| 38 | print gate |
| 40 | takeup reel |
| 44 | lamp house |
| 46 | color filters |
| 48 | shutter mechanism |
| 50 | color copying material |
| 52 | supply reel |
| 54 | takeup reel |
| 56 | optical system |
| 60,64 | measured density values |
| 62 | fitted line |
| 70 | gray reference point ($GM_o$, $ILL_o$) |
| 72 | threshold reference circle |
| 74,76 | transformed measured density values ($GM_i$, $ILL_i$) |
| 80 | 3 × 3 region matrix |
| 90 | gray reference point ($GM_{min}$, $ILL_{min}$) |
| 92 | threshold reference circle |
| 94,96 | transformed measured density values ($GM_{fav}$, $ILL_{fav}$) |

What is claimed is:

1. A method of determining the individually controllable amounts of light in various colors to which photographic copying material is to be exposed in a color copying operation from a length of photographic original material including a series of discrete image-carrying sections comprising the steps of:

individually photoelectrically measuring the density values of the original material in at least three basic colors at a plurality of regions from said series of discrete image-carrying sections of the original material; and establishing a single, multi-dimensional functional relationship among the at least three basic colors, said relationship defining a line representative of an exposure-level-dependent estimate of gray for all of said discrete image-carrying sections of said entire length of original material.

2. The method of claim 1 wherein each region is characterized according to either one or both of color saturation and edge determination, and said functional relationship is established from a subset of said regions from which selected regions are excluded on the basis of at least one of said characterizations.

3. The method of claim 2 wherein regions used in establishing said functional relationship are edge determined regions from which regions having color saturation exceeding a predetermined threshold have been excluded.

4. The method of claim 1 wherein the functional relationship is a least squares best fit line based on said density values for regions within said series of discrete image-carrying sections.

5. The method of claim 1 wherein the functional relationship is an approximation in the form of polynomials of at least second order.

6. The method of claim 1 further comprising:

determining sets of minimum and average density values in each of said colors for the length of original material;

establishing an initial gray point from a weighted average of said minimum and average density values;

calculating color saturation relative to said initial density gray point for regions within said series of discrete image carrying sections; and establishing said functional relationship from a subset of regions which excludes regions in which said calculated color saturation exceeds a predetermined threshold.

7. The method of claim 6 wherein frames of color saturation exceeding a predetermined threshold value are excluded from the establishment of said initial gray point.

8. The method of claim 6 wherein said length of original photographic material has data recorded thereon indicative of exposure of one or more image frames by artificial illuminant and wherein said artificial illuminant frames are excluded from establishment of said initial gray point.

9. The method of claim 6 wherein said length of original photographic material has data recorded thereon indicative of exposure of one or more image frames by artificial illuminant and wherein said artificial illuminant frames are excluded from establishment of said single, three dimensional functional relationship.

10. The method of claim 1 wherein said exposure-level-dependent estimate of gray is modified for frames having a percentage of regions of low density exceeding a predetermined threshold percentage.

11. The method of claim 10 wherein said method further comprises:

determining a set of minimum density values in each of said colors for the length of original material;

determining average density values for each of said frames in each of said colors; and said estimate of gray is modified by proportionate amounts of said minimum and average density values.

* * * * *